(12) United States Patent
Reich

(10) Patent No.: US 6,575,539 B2
(45) Date of Patent: Jun. 10, 2003

(54) WHEEL ATTACHMENT

(75) Inventor: Ronald K. Reich, Merrimack, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 09/866,882

(22) Filed: May 29, 2001

(65) Prior Publication Data

US 2002/0180256 A1 Dec. 5, 2002

(51) Int. Cl.[7] .................. B60B 23/00; B60B 27/02; B62D 61/00; F16H 7/20; F16D 1/06
(52) U.S. Cl. ............... 301/111.03; 301/117; 180/21; 474/903; 403/1
(58) Field of Search ............. 301/111.01, 111.032, 301/112, 114, 115, 117, 111.02, 111.04, 126, 131, 132; 295/43; 16/45; 180/21; 446/431, 95, 448, 465, 471; 474/8, 47, 165, 198, 273, 901, 903; 404/122, 123, 125, 126, 128, 131, 132; 172/17, 68, 73, 106, 186, 669, 107–108, 799.5, 174, 184, 286, 310, 354, 578; 403/1

(56) References Cited

U.S. PATENT DOCUMENTS

| | | | |
|---|---|---|---|
| 222,884 A | | 12/1879 | Falb |
| 359,403 A | * | 3/1887 | Pettinger ............... 301/126 |
| 554,536 A | * | 2/1896 | Powell ................. 301/132 |
| 634,151 A | | 10/1899 | Stanton |
| 797,726 A | | 8/1905 | Foster |
| 852,492 A | | 5/1907 | Bitzer |
| 937,316 A | * | 10/1909 | Marler ................. 301/132 |
| 944,936 A | * | 12/1909 | Barnett ................ 301/126 |
| 1,856,866 A | | 5/1932 | Feigelson |
| 2,151,045 A | * | 3/1939 | Ploehn ................ 403/366 |
| 3,909,066 A | | 9/1975 | Snowden |
| 3,963,361 A | * | 6/1976 | Schenk ............. 301/111.01 |
| 4,557,526 A | * | 12/1985 | Smith ................ 280/414.1 |
| 4,639,239 A | * | 1/1987 | Thirion de Briel et al. ... 474/28 |
| 4,665,766 A | * | 5/1987 | Umeha et al. ........... 474/903 |
| 4,773,889 A | * | 9/1988 | Rosenwinkel et al. ...... 152/454 |
| 5,022,333 A | * | 6/1991 | McClure et al. .......... 111/136 |
| 5,701,965 A | * | 12/1997 | Kamen et al. ............ 180/21 |
| 5,951,422 A | * | 9/1999 | Roes et al. ............. 29/892 |
| 5,971,091 A | * | 10/1999 | Kamen et al. ........... 180/218 |
| 6,224,028 B1 | * | 5/2001 | Tanaka et al. ........... 248/200 |

FOREIGN PATENT DOCUMENTS

FR 000600772 A1 * 6/1994 ............... 301/111

* cited by examiner

Primary Examiner—S. Joseph Morano
Assistant Examiner—Jason R. Bellinger
(74) Attorney, Agent, or Firm—Bromberg & Sunstein LLP

(57) ABSTRACT

An apparatus and method for attaching a wheel to an axle. The apparatus comprises a wheel with a hub for insertion into an indentation in the end of the axle and a non-cylindrically-symmetrical stud attached to the axle that is concentric with the axis of rotation of the wheel and axle, attaching the wheel to the axle.

5 Claims, 3 Drawing Sheets

WHEEL ATTACHMENT

FIELD OF THE INVENTION

The present application is directed to an apparatus and method for attaching a wheel to an axle.

BACKGROUND OF THE INVENTION

Many methods of attaching a wheel to an axle are known in the art. A wheel attachment must both secure the wheel to the axle and transfer torque and power efficiently from the axle to the wheel.

A common method employs a plurality of lug studs circumferentially spaced around the rotational axis of the axle. The lug studs are supported by a flange attached to the axle. The wheel is mounted on these lug studs through holes in the wheel that allow the studs to pass through the wheel. Lug nuts are screwed onto the lug studs, forcing the wheel against the flange as the lug nuts are tightened. The lug nuts retain the wheel on the axle and the torque and power of the axle are transferred to the wheel via the lug studs. The plurality of lug studs provides redundancy to the system since a loose lug nut will not cause the wheel to separate from the axle nor will it cause the wheel to slip relative to the rotation of the axle. The disadvantage of using more than one lug stud to secure the wheel to the axle is the added time required to attach or detach the wheel since more than one lug nut must be screwed or unscrewed from the lug studs. A second disadvantage is the additional cost associated with manufacturing the flange portion of the axle.

An improved approach for securing a wheel to an axle should: (a) maintain efficient torque and power transfer from the rotating axle to the wheel; (b) provide quick and easy attachment and detachment of the wheel from the axle; (c) provide redundancy for power transfer and (d) improve manufacturability by simplifying the design of the wheel and axle mating surfaces. Embodiments of the present invention address each of these needs.

SUMMARY OF THE INVENTION

In accordance with a preferred embodiment of the invention, a system is provided that has: (a) an axle having an indentation at a wheel-coupling end for a wheel hub; (b) a non-cylindrically-symmetrical lug stud, concentric with the axle, extending from the wheel-coupling end of the axle; (c) a wheel having a non-cylindrically-symmetrical clearance hole to admit the lug stud, the clearance hole at the center of the wheel; (d) a wheel hub, that is inserted into an indentation in the end of the axle; and (e) a fastener for attaching the wheel to the lug stud.

In accordance with a further embodiment of the invention, there is provided a method for securing a wheel to an axle. The method has the steps of: aligning the rotational axis of the wheel with the rotational axis of the axle; inserting the wheel hub into an indentation in an end of the axle; and fastening the wheel to the axle at a single point on the rotational axis of the wheel with a lug stud not possessing cylindrical-symmetry about the rotational axis of the axle.

DESCRIPTION OF PREFERRED EMBODIMENTS

Figure 1:
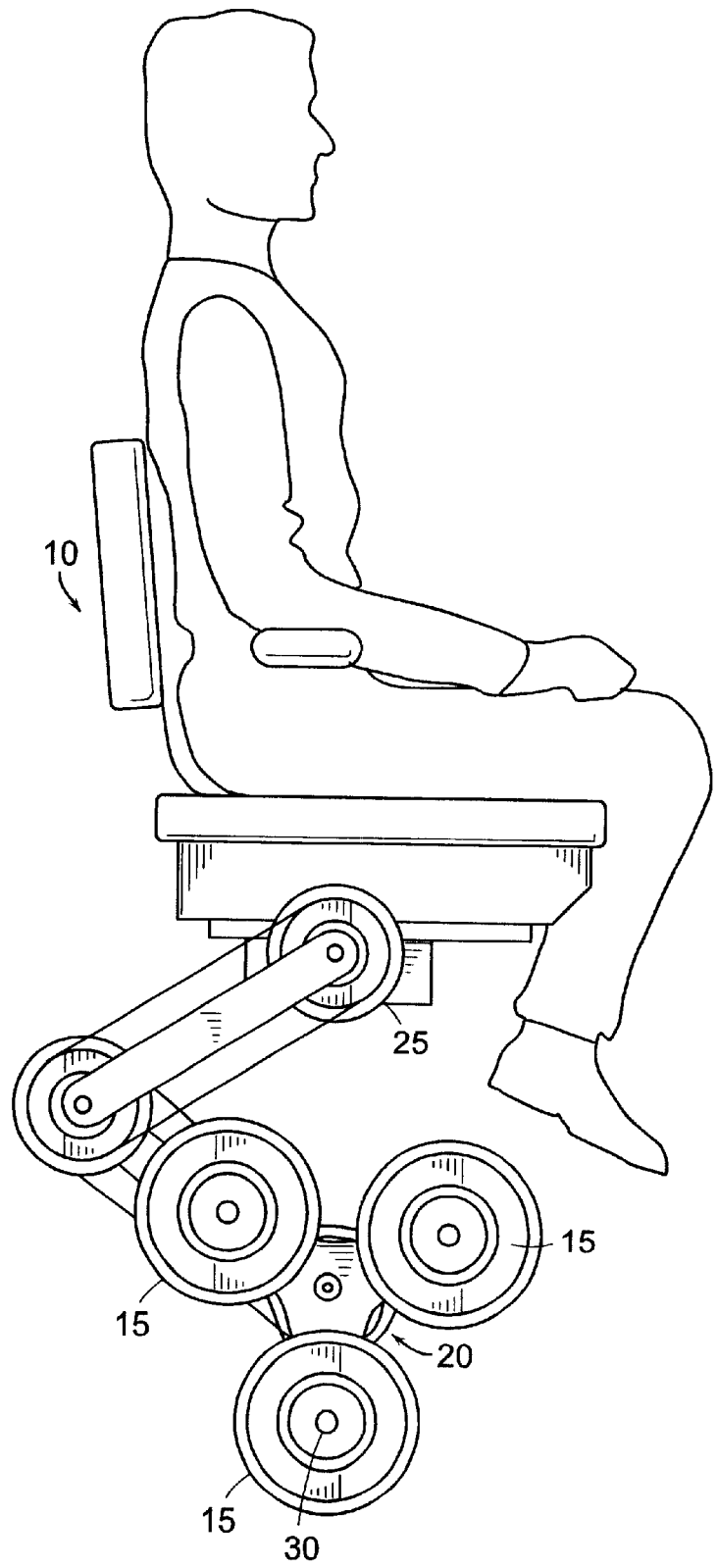
FIG. 1 shows a personal transporter.

The subject matter of this application is particularly suited for application to a personal transporter such as that described in U.S. Pat. No. 5,971,091, issued Oct. 26, 1999, which may require periodic wheel maintenance, which patent is incorporated herein by reference in its entirety. Such a personal transporter employing an embodiment of the present invention is shown in FIG. 1 and designated generally by numeral 10. The transporter includes a plurality of wheels 15, a motor 20, a controller 25, and an axle 30. While unstable when not powered, transporter 10 maintains balance during normal operation by sensing parameters such as $\theta$ and $\dot{\theta}$, and applying torque according to a control law, as described in detail in the '091 patent. Similarly, the subject matter of this application is suited for the human transporter described in U.S. Pat. No. 5,701,965, issued Dec. 30, 1997, also incorporated herein by reference.

Precise registration of the wheel and axle are particularly critical to a balancing vehicle, such as personal transporter 10 because the wheel must respond in an instantaneous and predictable manner to controller commands. Thus, use of multiple attachment points between axle and wheel would appear to be required. Preferred embodiments of the present invention achieve precise registration with a single attachment point.

Figure 2:
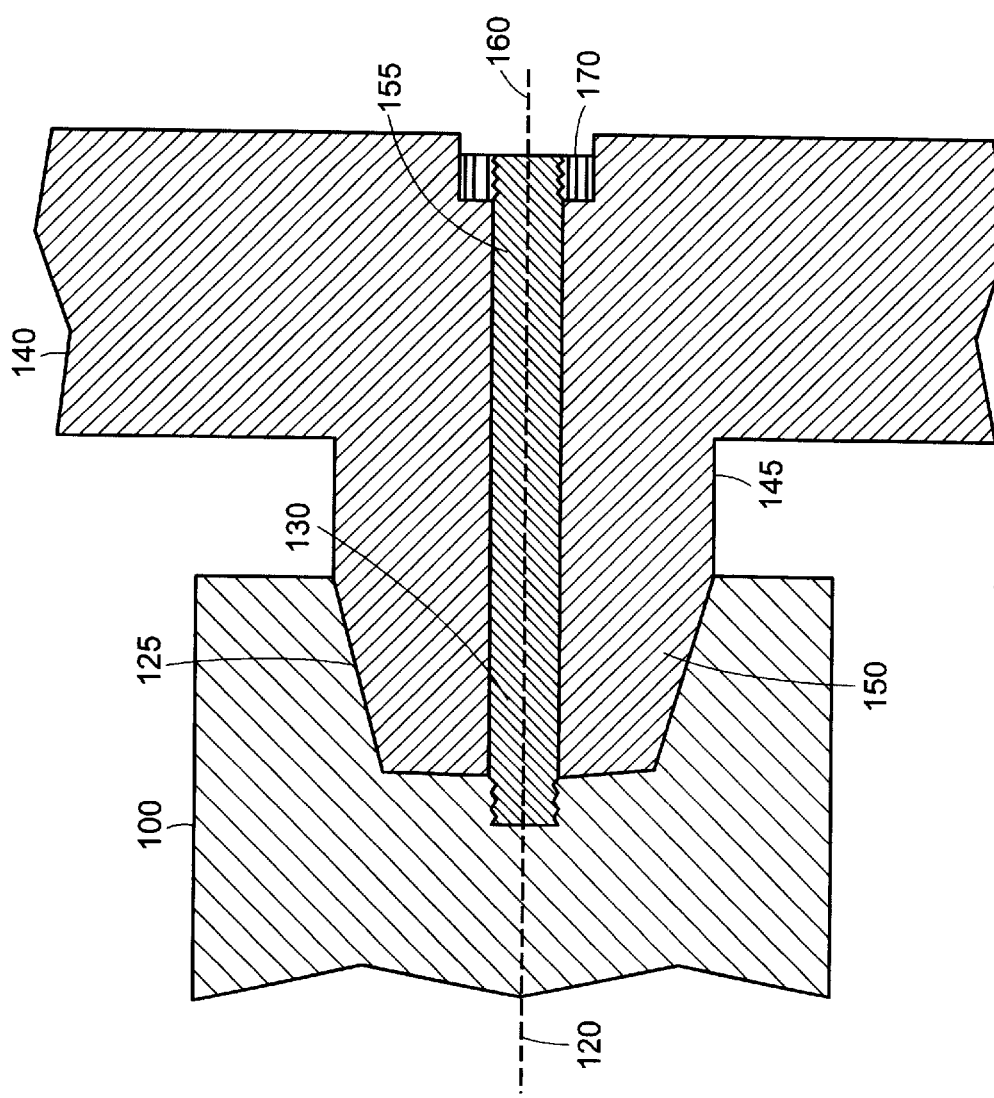
FIG. 2 shows a sectional side view of an embodiment of the present invention.

FIG. 2 shows a sectional side view of one embodiment of the present invention which advantageously couples a wheel to an axle. An axle 100 has a rotational axis 120. The wheel-coupling end of the axle has a tapered indentation 125 centered on the rotational axis 120. A lug stud 130, extends from the tapered indentation 125 and has an axis that is parallel to and coincident with the rotational axis 120. The lug stud is non-cylindrically-symmetrical about the rotational axis and may be, for example without limitation, hexagonally shaped when viewed in cross-section perpendicular to the rotational axis. The lug stud is removable from the axle, but is locked in place while the axle is operational by means of a press-fit technique or any one of a number of means known in the art for securing lug studs to axles.

A wheel 140 includes a hub 145 that is centered on the wheel's rotational axis 160 and extends along the wheel's rotational axis 160. The term "wheel" as used in this description and in any appended claims will be understood to include any element that turns about an axis of rotation, transforming angular momentum to linear momentum by rolling along a surface. As used in this description and in any appended claims, the term "hub" will be understood to encompass any arbitrarily-shaped protrusion from the wheel that is concentric with the rotational axis 160 of the wheel. The hub 145 has a tapered end 150 that is shaped and sized to fit into the tapered indentation 125 such that when the hub 145 is seated in the tapered indentation 125, the rotational axis of the axle 100 and the rotational axis of the wheel are coincident. The wheel 140 includes a clearance hole 155, the hole having an axis that is parallel to and coincident with the rotational axis 160 of the wheel. The clearance hole is sized and shaped to allow insertion of the lug stud 130.

Figure 3:
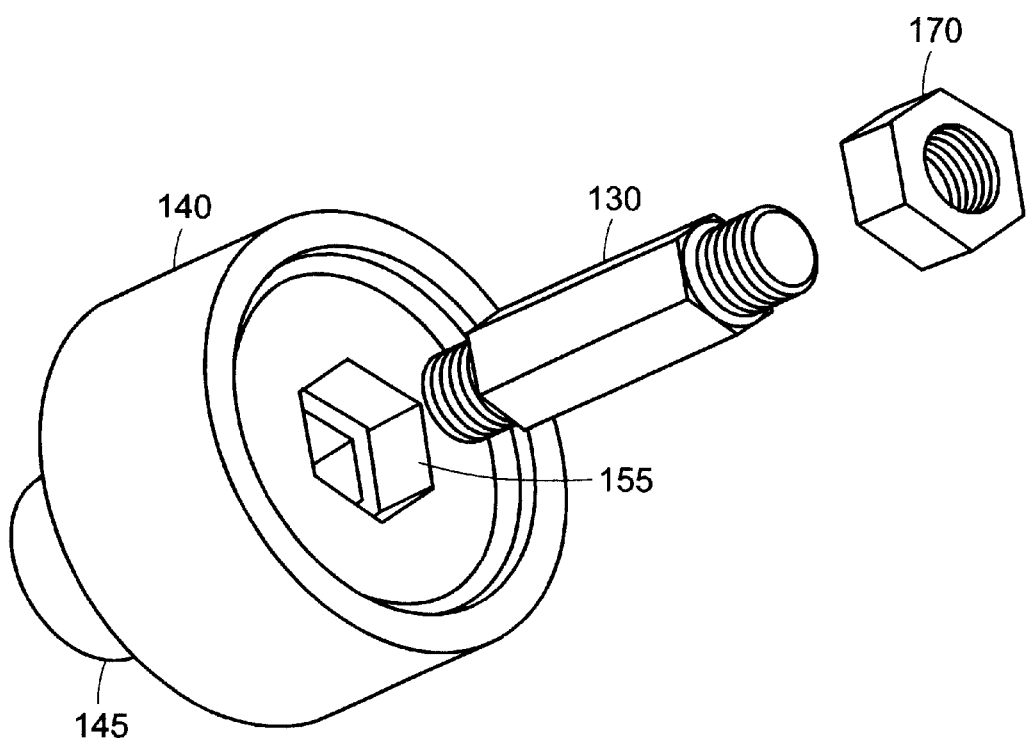
FIG. 3 shows an exploded view of the wheel assembly of an embodiment of the present invention.

A fastener 170, such as a lug nut, attaches to the lug stud 130, securing the wheel 140 to the axle 100. As the fastener 170 is tightened, the wheel hub 140 is forced against the axle indentation 125, producing a force component normal to the tapered surface of the hub 150. The normal force generates a frictional force on the tapered surface of the hub and the tapered surface of the indentation of the axle thereby efficiently transferring torque and power from the rotating axle to the wheel. If the fastener 170 loosens and the tapered surfaces begin to lose contact, the non-cylindrically-symmetrical lug stud 130 mated to the similarly shaped clearance hole 155 places the lug stud in torsion and, thereby, creates a torque on the wheel that continues to drive the wheel. By providing a non-cylindrically-symmetrical lug stud mated to a similarly shaped clearance hole in the wheel, the present invention provides a redundant drive mechanism for the wheel, while using only a single lug stud and fastener. FIG. 3 shows an exploded view of the wheel assembly and the lug stud of an embodiment of the present invention.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A wheel and axle system, the system comprising:
   a. an axle having a rotational axis and an indentation at a wheel-coupling end for a wheel hub;
   b. a lug stud, extending from the wheel-coupling end of the axle, concentric with and parallel to the rotational axis of the axle, the lug stud not cylindrically symmetrical about the rotational axis of the axle;
   c. a wheel having a rotational axis through a center and a clearance hole to admit the lug stud, the clearance hole parallel to and concentric with the rotational axis of the wheel;
   d. a wheel hub, the wheel hub connected to the wheel and disposed within the indentation of the axle; and
   e. a fastener for attaching the wheel to the lug stud.

2. A wheel and axle system as in claim 1, wherein the lug has a shaped cross section along the rotational axis of the axle.

3. A method for attaching a wheel to an axle, the wheel having a rotational axis and a hub centered about the rotational axis and the axle having a rotational axis, the method comprising:
   a. aligning the rotational axis of the wheel with the rotational axis of the axle;
   b. inserting the wheel hub into an indentation in an end of the axle; and
   c. fastening the wheel to the axle at a point on the rotational axis of the wheel by inserting a lug stud through a clearance hole in the wheel and securing the lug stud with a fastener, the lug stud attached to the axle and not cylindrically symmetrical about the rotational axis of the axle.

4. A wheel, the wheel characterized by a rotational axis and a plane of rotation, the wheel comprising:
   a. a non-cylindrically-symmetrical clearance hole parallel to and concentric with the rotational axis of the wheel for admission of a lug stud; and
   a. a hub extending about the rotational axis outside the plane of rotation for insertion into an indentation in a wheel-coupling end of an axle.

5. An axle, the axle characterized by a rotational axis, the axle comprising:
   a. an indentation at a wheel-coupling end for a wheel hub; and
   b. a lug stud extending from the wheel-coupling end of the axle for securing a wheel, the lug stud parallel to and concentric with the rotational axis and non-cylindrically-symmetrical about the rotational axis.

* * * * *

UNITED STATES PATENT AND TRADEMARK OFFICE
CERTIFICATE OF CORRECTION

PATENT NO.     : 6,575,539 B2
DATED          : June 10, 2003
INVENTOR(S)    : Ronald K. Reich It is certified that error appears in the above-identified patent and that said Letters Patent is hereby corrected as shown below:

Column 4,
Line 2, replace "has a shaped cross section" with -- has a hexagonally shaped cross section --.

Signed and Sealed this

Twelfth Day of August, 2003

JAMES E. ROGAN
*Director of the United States Patent and Trademark Office*